Figure 1:
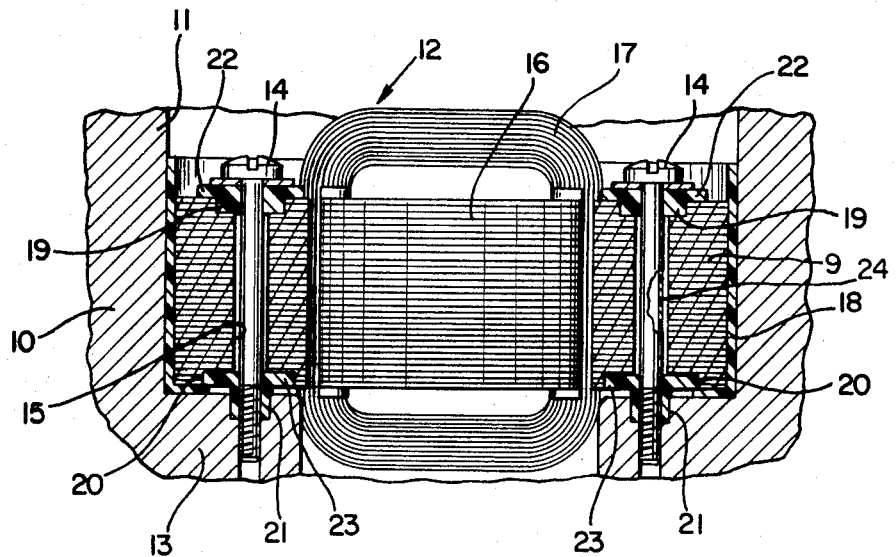

United States Patent
Ostwald

[15] 3,693,035
[45] Sept. 19, 1972

[54] DOUBLE INSULATED FIELD MOUNTING FOR UNIVERSAL MOTOR
[72] Inventor: Erich Ostwald, Baltimore, Md.
[73] Assignee: The Black and Decker Manufacturing Company, Towson, Md.
[22] Filed: Sept. 15, 1970
[21] Appl. No.: 72,372

[52] U.S. Cl. ............310/51, 310/217, 310/259
[51] Int. Cl. ....................H02k 5/08, H02k 3/30
[58] Field of Search......310/47, 50, 51, 89, 217, 179, 310/254–259, 43

[56] References Cited

UNITED STATES PATENTS

| | | | |
|---|---|---|---|
| 2,615,068 | 10/1952 | Radice | 310/259 X |
| 3,200,275 | 8/1965 | Lindgren | 310/259 X |
| 3,447,010 | 5/1969 | Vreeland | 310/217 |
| 3,512,902 | 5/1970 | Emmons et al. | 310/259 X |
| 3,476,960 | 11/1969 | Rees | 310/50 |
| 3,119,942 | 1/1964 | Luther | 310/50 |
| 3,121,813 | 2/1964 | Pratt et al. | 310/50 |
| 3,344,291 | 9/1967 | Pratt | 310/50 |
| 3,413,498 | 11/1968 | Bowen et al. | 310/47 |
| 3,457,438 | 7/1969 | Badcock | 310/50 |
| 3,462,623 | 8/1969 | Batson et al. | 310/50 |

Primary Examiner—Lewis H. Myers
Assistant Examiner—Stanley J. Witkowski
Attorney—Leonard Bloom, Joseph R. Slotnik and Edward D. Murphy

[57] ABSTRACT

A double insulated heavy duty electric power tool having a metal housing for resisting shock impacts and vibration, and a universal electric motor mounted in the housing. The motor includes a field mounted in the housing with an insulating barrier between the field and the housing. A plurality of insulated bolts secure the field to the housing and a pair of insulating washers associated with each of the bolts maintain a space between the field and the bolts during the after assembly.

8 Claims, 2 Drawing Figures

3,693,035

PATENTED SEP 19 1972

INVENTOR.
ERICH OSTWALD
BY
*Edward D. Murphy*

DOUBLE INSULATED FIELD MOUNTING FOR UNIVERSAL MOTOR

The present invention is directed to a mounting assembly for the field of an electric motor and is particularly directed to an insulating mounting which positions the field very precisely during assembly.

Heavy duty electric tools such as electric hammers require the utmost in strength of construction in order to withstand the wear and abuse to which they are normally subjected. It is also desirable, in the interest of safety, to provide an extra layer of insulation in addition to the normal, functional insulation to protect the user in the event of failure of the normal insulating barrier. For example, if the insulation on the magnet wire wound in the field core in a universal motor fails, the field core itself may become live. Present standards of double insulation require that a second layer of insulation be used to insulate the field and its mounting parts from external touchable metal. In the manufacture of such tools, the assembly of these parts requires a high degree of precision in the relative location of the parts so that the integrity of the insulation between the external metal casing and the internal, singly insulated part is not affected. The purpose of this invention is the provision of a motor mounting assembly which can be rapidly assembled by mass production techniques without affecting the integrity of this insulation and at the same time maintaining precise positioning of the parts.

Accordingly, it is an object of this invention to provide an improved mounting assembly for locating an electric motor field within a housing.

Another object of this invention is the provision of an improved insulated mounting assembly for an electric motor field which enables quick, simplified assembly of the field into the housing.

It is also an object of this invention to provide an improved mounting assembly for electric motor fields which is of relatively low cost.

Further objects and advantages of this invention will become apparent as the description and illustration thereof proceed.

Briefly, in accord with one embodiment of this invention, an improved mounting assembly comprises a housing shaped to receive a motor field core and field coils with an insulating barrier therebetween. A bolt extends through a bore in the field core and is threaded into the housing to mount the field. An insulating barrier is provided between the bolt and the bore in the laminations in which the bolt is mounted. In accord with this invention, a pair of insulating shoulder washers are provided around the bolt at each end of the field core. A first of these washers includes a cylindrical portion which extends into an enlarged portion of the bore through the field laminations and an extended flange portion against which the head of the bolt bears through a washer. The second of the insulating washers is piloted in an enlarged bore in the casting coaxial with the threaded portion thereof and it also includes a radially extending flange which is located in an enlarged portion of the bore in the field core. In assembly, the washers are placed in the field core and the field is mounted in the housing, preferably being separated therefrom by an intermediate insulating sleeve. Next, the bolts are inserted and turned into the threaded portion of the housing. During this step, the insulating washers provide pilot openings for the bolt so that there is no danger of the insulation being scraped off from the bolt due to contact with the edges of the laminations.

IN THE DRAWING

Figure 2:
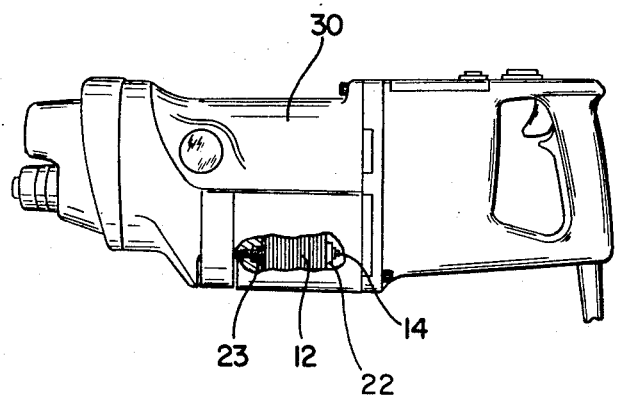

FIG. 1 is a cross sectional view of a field mounting in accord with this invention; and FIG. 2 is a side elevation, partially broken away, of a tool in accord with this invention.

In the drawing, the metal housing of a power tool intended for heavy duty use is illustrated at 10. Within an appropriately shaped bore 11 thereof, a field 12 is mounted, preferably by being bolted against a seat formed by a shoulder 13. The field 12 includes a core 9 of stacked laminations and field coils 17 of magnet wire wound thereon in the conventional manner. The bolts 14 extend through bores 15 which are provided in the field and are mounted in threaded bores in the shoulder 13. The illustrated field is that for a universal electric motor having pole tips 16 and windings 17. Appropriate application of power produces an electric field extending across the central bore of the field and causes rotation of an armature mounted therein.

In accord with the previously noted double insulation standards, the touchable casing must be insulated from the field since this could become live if the functional insulation should fail. To protect the operator against this possibility, an insulating sleeve 18 is provided which surrounds the field core and prevents electrical contact between the field and the casing. As an additional part of this protection, since the bolts 14 extend through the field core and are separated therefrom only by a small air gap, an insulating sleeve 24 is provided between the bolts and the field core. A preferred form for this sleeve is an insulating tape of appropriate material such as Mylar which is wrapped on the shank of the bolts. In the assembly of the field core and casing, the field must be carefully positioned above the threaded openings in the casing and it must also be centered relative to the bore through the laminations since, if it were not, the insulating layer on the bolt could be broken by the edges of the laminations, thus bypassing the insulating sleeve. In accord with this invention, this possibility is avoided by providing enlarged bores 19 and 20 in the field core and enlarged bores 21 in the casing. Two pairs of shoulder washers 22 and 23 are provided of insulating material such as a glass filled polycarbonate which fit within these enlarged bores and provide for precise location of the field core within the casing and of the bolt within the bore. Thus, when the tools are being assembled on a mass production assembly line, an assembler is not required to exercise great care in the positioning of the parts. Instead, assembly consists of placing the parts together so that the washers fit within the respective bores and then dropping the bolts into place and bolting the field down tightly against the casing. At no time during this operation is there danger that a slight misalignment of the parts might cause any damage to the integrity of the insulation. Furthermore, the precise location of the field relative to the casing and to the armature which is later added is also assured.

FIG. 2 illustrates a specific use of this construction in an electric hammer 30. As can be seen in the cutaway portion, the field is mounted in accord with FIG. 1. In addition to the advantages obtained during assembly, this construction also increases the safety of the tool during use. For example, it is not possible for the bolt to be angled so that the field is not securely mounted. This also assures the existence of two continuous insulative barriers between the bolt and the field, namely, the tape and the air gap.

Accordingly, when the hammer 30 is used and subjected to the constant impacts and vibration of its normal operation, the metal housing is capable of extended duty and, at the same time, the operator is protected from electrical hazard if the functional insulation should become defective.

It will be clear to those skilled in the art that changes and modifications can be made from the specific embodiment illustrated while still utilizing the basic concept of this construction. Accordingly, it is intended that the appended claims be interpreted to cover all such modifications as may fall within the true spirit and scope of this invention.

I claim:

1. A double insulated field mounting assembly for an electric motor enclosed in a metal housing comprising
   a universal electric motor field including a field core and a plurality of wound field coils;
   a metal housing having a bore receiving said field core;
   an insulating barrier interposed between said field core and said housing;
   a plurality of bolts extending from one end of said field core into said housing adjacent the opposite end of said field core securing said field to said housing;
   a plurality of first insulating washers separately surrounding each of said bolts individually and extending into a bore in said one end of said field;
   a plurality of second insulating washers separately surrounding each of said bolts individually and extending into a bore at said opposite end of said field core;
   said first and second washers cooperating to pilot said bolts in spaced relation to said field core.

2. The assembly claimed in claim 1 wherein said field core is provided with bores through which said bolts extend and wherein said bores of said first and second washers comprise enlarged portions coaxial with said bolt bores.

3. The assembly claimed in claim 2 wherein an insulating sleeve is disposed around each of said bolts.

4. The assembly claimed in claim 2 wherein said housing includes a plurality of bores, said bolts extending into and being secured to said bores.

5. The assembly claimed in claim 4 wherein each of said second insulating washers includes an axially extending portion mounted in one of said bores.

6. The assembly claimed in claim 2 wherein each of said first insulating washers includes a shoulder portion of enlarged diameter which overlies said field around said bolt.

7. The assembly claimed in claim 6 wherein each of said second insulating washers includes an axially extending portion mounted in a bore in said housing.

8. A double insulated heavy duty electric power tool comprising a metal housing for resisting shock impacts and vibration; and a universal electric motor, said motor including
   a field core mounted in said housing;
   an insulating barrier between said field core and said housing;
   a plurality of bolts securing said field core to said housing;
   a pair of insulating washers associated with each of said bolts, said pair of washers being disposed between said bolts and said field so as to maintain a space therebetween during and after assembly said bolts extending through bores in said field, said washers being mounted in enlarged portions of said bores.

* * * * *